(12) United States Patent
Cayzac (10) Patent No.: US 10,348,001 B2
(45) Date of Patent: Jul. 9, 2019

(54) DEVICE FOR HOLDING AT LEAST ONE ELECTRICALLY CONDUCTIVE PIPE ON AN ELECTRICALLY CONDUCTIVE STRUCTURE

(71) Applicant: AMPHENOL—AIR LB, Carignan (FR)

(72) Inventor: Gaspard Cayzac, Margut (FR)

(73) Assignee: AMPHENOL —AIR LB, Carignan (FR)

( * ) Notice: Subject to any disclaimer, the term of this patent is extended or adjusted under 35 U.S.C. 154(b) by 0 days.

(21) Appl. No.: 15/957,846

(22) Filed: Apr. 19, 2018

(65) Prior Publication Data

US 2018/0337465 A1 Nov. 22, 2018

(30) Foreign Application Priority Data

May 19, 2017 (FR) ..................................... 17 54430

(51) Int. Cl.
| | | |
|---|---|---|
| *H01R 4/64* | (2006.01) | |
| *F16L 3/223* | (2006.01) | |
| *F16L 55/035* | (2006.01) | |
| *F16L 23/00* | (2006.01) | |
| *F16L 3/237* | (2006.01) | |
| *F16L 25/01* | (2006.01) | |
| *H01R 4/60* | (2006.01) | |

(52) U.S. Cl.
CPC .............. *H01R 4/64* (2013.01); *F16L 3/2235* (2013.01); *F16L 23/00* (2013.01); *F16L 55/035* (2013.01); *H01R 4/643* (2013.01); *F16L 3/237* (2013.01); *F16L 25/01* (2013.01); *H01R 4/60* (2013.01)

(58) Field of Classification Search
CPC ..................................... H01R 4/64; H01R 4/66
USPC .......................................................... 439/192
See application file for complete search history.

(56) References Cited

U.S. PATENT DOCUMENTS

| | | | |
|---|---|---|---|
| 2,417,260 A | 3/1947 | Morehouse | |
| 3,986,323 A | 7/1976 | Blanchet | |
| 5,261,633 A * | 11/1993 | Mastro ...................... | F16L 3/18 248/68.1 |

(Continued)

FOREIGN PATENT DOCUMENTS

| | | |
|---|---|---|
| EP | 0 139 980 A2 | 5/1985 |
| FR | 2260199 A1 | 8/1975 |

*Primary Examiner* — Tulsidas C Patel
*Assistant Examiner* — Peter G Leigh
(74) *Attorney, Agent, or Firm* — Craft Chu PLLC; Andrew W. Chu (57) ABSTRACT

The device for holding at least one electrically conductive pipe on an electrical conductive structure with an electrical connection between such a structure and at least one such pipe includes a holding half-flange, a fastening half-flange to be fastened to the structure, to be assembled with the holding half-flange, and an electrical connection device for electrically connecting the structure and the pipe or pipes. The electrical connection device includes at least one pad, made of an electrically conductive flexible material, lining the fastening half-flange, and configured to electrically cooperate with one of the pipes. The device also includes at least one pusher, made of an electrically conductive material, configured to electrically cooperate with the structure as well as with the pad or with one of the pads of the fastening half-flange, movable in displacement between an extended position outside the fastening half-flange and a retracted position inside this fastening half-flange.

13 Claims, 4 Drawing Sheets

(56) References Cited

U.S. PATENT DOCUMENTS

| | | | | |
|---|---|---|---|---|
| 6,840,782 B1* | 1/2005 | Borden | ............... | H01R 4/643 |
| | | | | 439/92 |
| 6,892,990 B2* | 5/2005 | Pisczak | ............... | H02G 7/053 |
| | | | | 248/62 |
| 7,770,848 B2* | 8/2010 | Johnson | ............... | F16L 3/1207 |
| | | | | 248/65 |
| 8,602,798 B2* | 12/2013 | Downing | ............... | F16L 3/00 |
| | | | | 248/65 |
| 2005/0248098 A1* | 11/2005 | Sisk | ............... | F16L 21/005 |
| | | | | 277/616 |
| 2013/0187013 A1* | 7/2013 | Minami | ............... | B64D 37/005 |
| | | | | 248/70 |
| 2015/0102600 A1 | 4/2015 | Schooley | | |
| 2015/0240768 A1* | 8/2015 | Rehwald | ............... | F02M 55/025 |
| | | | | 248/636 |

\* cited by examiner

DEVICE FOR HOLDING AT LEAST ONE ELECTRICALLY CONDUCTIVE PIPE ON AN ELECTRICALLY CONDUCTIVE STRUCTURE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a device for holding at least one electrically conductive pipe on an electrically conductive structure with an electrical connection between such a structure and at least one such pipe.

The invention is related to the field of the manufacture of equipment intended to ensure the holding of at least one pipe of a pipework on an electrically conductive structure while ensuring a grounding of this or these pipes.

This invention will find a particularly suitable application for holding a pipe likely to adopt, with respect to the structure, a movement, namely a sliding and/or of low amplitude movement. This invention will also find a particularly suitable application for holding a pipework in an environment likely to cause damage to such a pipework, such as a corrosive atmosphere (for example a saline atmosphere) and/or a humid atmosphere (for example, in which the pipework is subjected to water spray) and/or polluting (for example dusty) atmosphere. Finally, and without the present invention being limited thereto, this invention will find a particular usefulness in the aeronautical field when the holding of a pipework on a structure, inside an aircraft, has to be ensured.

2. Description of Related Art Including Information Disclosed Under 37 CFR 1.97 and 37 CFR 1.98

Already known are devices for holding at least one electrically conductive pipe on an electrical conductive structure with an electrical connection between such a structure and at least one such pipe.

Such a device adopts the form of a flange including, on the one hand, a fastening half-flange intended to be fixed to the structure and including at least one recess for receiving at least one pipe and, on the other hand, a holding half-flange, intended to be assembled with the fastening half-flange, and including at least another recess, made in line with the recess or recesses of the fastening half-flange and defining, with this or these recesses, one or several accommodations for receiving one or several pipes. This holding device is complemented with electrical connection means designed to electrically connect the structure and the pipe or pipes. These electrical connection means include, on the one hand, at least one collar, each intended to be secured around a pipe or one of the pipes and, on the other hand, at least one metal braid, each connected a collar as well as to a fastening bracket the structure includes or to another collar connected, in turn, to such a fastening bracket.

Such a device has several drawbacks. In particular, the electrical connection means are additional means independent from the holding device, which require, for their installation, an additional step independent from the fastening of the pipe or pipes to the structure. In addition, the installation of these electrical connection means proves to be a long and tedious step, namely because of the difficulties of access due to the proximity between the structure and the pipework and/or between the pipes of this pipework, even also due to the congested environment of the holding device, more particularly inside an aircraft. In addition, the use of such electrical connection means requires the provision, at the level of the structure, of at least one fastening bracket.

Also known is another holding device adopting the form of a flange, including here too, on the one hand, a fastening half-flange intended to be fixed to the structure and including at least one recess for receiving at least one pipe and, on the other hand, a holding half-flange, intended to be assembled with the fastening half-flange, and including at least another recess, each made in correspondence with the recess or recesses of the fastening half-flange and defining, with this or these recesses, one or several accommodations for receiving one or more pipes. The fastening half-flange of this holding device also includes electrical connection means for electrically connecting the structure and the pipe or pipes. These electrical connection means include, on the one hand, at least one rigid and electrically conductive cradle, each arranged on the bottom of a recess of this fastening half-flange and each designed to cooperate directly with a pipe, on the other hand, at least one electrically conductive spring, which cooperates with such a cradle and which is designed to push such a cradle towards such a pipe and, yet on the other hand, an electrically conductive rail, which the or the springs cooperate with and which cooperates with the electrically conductive structure.

Such a holding device has however many drawbacks. In fact, the half-flanges (in particular the cradles) are usually made of aluminum, while the pipe or pipes are usually made of steel or titanium. This results into a galvanic couple directly responsible for the corrosion of this or these pipes. In addition, in order to achieve the electrical conductivity between a cradle and a pipe, it is necessary to locally remove the anticorrosive protective paint of such a pipe. Now, since the holding device can be implanted in a corrosive atmosphere (for example a saline atmosphere) and/or a wet atmosphere (for example, in which the pipe is subjected to water spray), the absence of anticorrosion treatment causes corrosion of such a pipe. Another drawback resides in that between such a pipe and the electrical connection means (more particularly the cradle or cradles of these electrical connection means) occurs an accumulation of polluting particles (for example dust), which tends to lessen, even to prevent, the electrical conduction between such a pipe and the structure. Finally, the movement of such a pipe with respect to the half-flanges (namely with respect to a cradle the fastening half-flange includes) causes damage to such a pipe and/or to such a half-flange (namely in the form of chips of torn material).

BRIEF SUMMARY OF THE INVENTION

The present invention pretends to cope with the drawbacks of the holding devices of the state of the art.

To this end, the invention relates to a device for holding at least one electrically conductive pipe on an electrical conductive structure with an electrical connection between such a structure and at least one such pipe. This holding device includes a flange including, on the one hand, a fastening half-flange configured to be assembled with the structure and, on the other hand, a holding half-flange configured to be assembled with the fastening half-flange and complementary to this fastening half-flange, these half-flanges each including a rigid body as well as each, in front of the other half-flange, on the one hand, at least one recess each configured to receive a pipe, each arranged in front of another recess the other half-flange includes, and each complementing such other recess in order to form an accommodation for receiving the pipe or one of the pipes. This holding device also includes electrical connection means, which are configured to electrically connect the structure and the pipe or pipes, and which the fastening half-flange includes.

This holding device is characterized in that the electrical connection means include, on the one hand, at least one pad, each made of a flexible electrically conductive material, each lining the recess or one of the recesses of the fastening half-flange, and each configured to electrically cooperate with the pipe or with one of the pipes and, on the other hand, at least one pusher, each made of an electrically conductive material, each configured to electrically cooperate with the structure as well as with the pad or with one of the pads of the fastening half-flange, each movable in displacement between an extended position outside the fastening half-flange and a retracted position within this fastening half-flange.

Another feature resides in that the holding half-flange includes at least one pad, each made of a flexible material, each lining the recess or one of the recesses of the holding half-flange, and each arranged in front of the pad or one of the pads of the fastening half-flange.

An additional feature relates to the fact that the pad or pads are made of a compressible material and/or silicone, while the pusher or pushers are made of a rigid material and/or metal.

Yet another feature resides in that the fastening half-flange includes a fastening face intended to be oriented towards the structure, even to cooperate with this structure, and with respect to which the pusher or pushers extend protruding in the extended position.

According to another feature, the fastening half-flange includes at least one cradle, each made of a rigid material, each partially lining the inner face of the pad or one of the pads of this fastening half-flange, each configured to cooperate with the pipe or with one of the pipes as well as to be interposed between such a pad and such a pipe.

Thus, the holding device includes electrical connection means including at least one electrically conductive pad and at least one movable electrically conductive pusher. These features advantageously permit, under the action of the fastening of the holding device to the structure, to ensure an electrical connection between this structure and the pipe or pipes held through this holding device. This electrical connection is performed at the same time as the step of fastening the holding device to said structure, without any additional step.

In addition, the presence of these electrical connection means (in particular of the flexible pad or pads) advantageously permits to ensure such an electrical connection while permitting a movement of the pipe or pipes with respect to the structure and avoiding a degradation of this or these pipes under the action of such a movement.

In addition, the presence of these electrical connection means (in particular of the pusher or pushers) advantageously permits to ensure and maintain a fair, reliable, effective and durable electrical contact, on the one hand, between such a pusher and the structure, on the other hand, between such a pusher and a pad and, yet on the other hand, between such a pad and a pipe.

The holding device (more particularly the fastening half-flange of this holding device) includes at least one rigid cradle, each one partially lining the inner face of a pad, and each configured to cooperate with a pipe. The presence of such a cradle advantageously permits, on the one hand (and because of the configuration of such a cradle), to ensure a fair, reliable, effective and durable contact of such a cradle with a pipe and, on the other hand (and because of the partial lining of the pad), to ensure a direct electrical contact between such a pad and such a pipe.

Further aims and advantages of the present invention will become clear from the following description relating to embodiments, which are given only by way of indicative and non-restrictive examples.

BRIEF DESCRIPTION OF THE SEVERAL VIEWS OF THE DRAWINGS

The understanding of this description will be facilitated when referring to the attached drawings.

DETAILED DESCRIPTION OF THE INVENTION

The present invention relates to the field of the manufacture of equipment intended to ensure the holding of at least one pipe of a pipework on a structure, while ensuring a grounding of this or these pipes.

The invention then relates more particularly to a holding device 1 designed to hold at least one electrically conductive pipe (more particularly a plurality of electrical conductive pipes and/or which a pipework includes) on an electrically conductive structure S (more particularly consisting of a metal wall), while ensuring an electrical connection between such an electrical conductive structure S and at least one such electrically conductive pipe.

This holding device 1 includes a flange 2 configured to receive at least one such pipe, even a plurality of pipes, which a pipework includes.

This flange 2 includes, on the one hand, a fastening half-flange 3 or first half-flange configured to be fastened to the structure S, by means of fastening means and, on the other hand, a holding half-flange 4 or second half-flange, complementary to this fastening half-flange 3 and configured to be assembled with this fastening half-flange 3, through assembling means.

These half-flanges (3; 4) each include a rigid body (30; 40) or a first rigid body 30 and a second rigid body 40, more particularly made of an electrically non-conductive material, namely plastic and/or composite material.

In addition, these half-flanges (3; 4) each include at least one receiving means (31; 41) for receiving, as the case may be, fastening means for fastening the holding device 1 to the structure S and/or assembling means for assembling these two half-flanges (3; 4).

According to a particular embodiment, the fastening half-flange 3 (more particularly the rigid body 30 of this fastening half-flange 3) includes at least one receiving means 31 each adopting the shape of a through hole.

The holding half-flange 4 (more particularly the rigid body 40 of this holding half-flange 4) includes at least one receiving means 41, each adopting the shape of a through hole and each located in the extension of the through hole of a receiving means 31 of the fastening half-flange 3. In such a case, the fastening means can be comprised of at least one fastening screw passing through the through holes of the receiving means (31; 41) of the half-flanges (3; 4) and defining advantageously means for assembling these half-flanges (3; 4), more particularly designed to perform the assembling of these half-flanges (3; 4) under the action of the fastening of the holding device 1 to the structure S.

These half-flanges (3; 4) each include, in front of the other half-flange (4; 3), on the one hand, at least one recess (32; 42) or a first recess 32 and a second recess 42, each configured to receive a pipe, each arranged in front of another recess (42; 32) the other half-flange (4; 3) includes, and each complementing such other recess (42; 32) in order to form an accommodation 5 for receiving the pipe or one of the pipes.

In this respect, it should be observed that the recess or recesses (32; 42) have a semicircular general shape and/or have an inner radius larger than the outer radius of the pipe of the pipework it receives. In addition, the accommodation or accommodations 5 have a shape corresponding substantially to the cross-section of the pipe it receives (more particularly a circular shape) and/or have an inner radius larger than the outer radius of such a pipe.

Another feature resides in that the holding device 1 includes electrical connection means 6, which are configured to electrically connect the structure S and the pipe or pipes.

In fact, more particularly the fastening half-flange 3 includes such electrical connection means 6.

These electrical connection means 6 include, on the one hand, at least one pad 7, each made of an electrically conductive flexible material, each lining the recess 32 or one of the recesses 32 of the fastening half-flange 3, and each configured to electrically cooperate with the pipe or with one of the pipes and, on the other hand, at least one pusher 8, each made of an electrically conductive material, each configured to electrically cooperate with the structure S as well as with the pad 7 or one of the pads 7 of the fastening half-flange 3, each movable in displacement between an extended position outside the fastening half-flange 3 and a retracted position within this fastening half-flange 3.

As mentioned above, these electrical connection means 6 include at least one pad 7 made of an electrically conductive flexible material.

This or these pads 7 are then made of a flexible material, which allows, advantageously and under the effect of the action of a pusher 8, to deform such a pad 7 and to bring this pad 7 into contact with the pipe or one of the pipes.

This or these pads 7 are preferably made of a compressible material. This feature advantageously permits, on the one hand, to guarantee an effective and durable holding of such a pipe within the holding device 1 and, on the other hand, a movement of such a pipe with respect to this holding device 1. This feature also permits, advantageously and under the action of a pusher 8, to guarantee an efficient and durable electrical connection between such a pad 7 and a pipe.

According to a preferred embodiment of the invention, this or these pads 7 are made of silicone.

Another feature resides in that such a pad 7 has, on the one hand, an outer face 70 oriented towards a recess 32 of the rigid body 30 of the fastening half-flange 3 and into contact with the surface of such a recess 32 (more particularly lining this surface) and, on the other hand, an inner face 71, opposite to the outer face 70, intended to be oriented towards a pipe and intended to cooperate with a such pipe.

The electrical connection means 6 also include at least one pusher 8, each made of an electrically conductive material. In fact, this or these pushers 8 are preferably made of a rigid and/or metallic material, namely aluminum, steel or titanium.

A particular embodiment resides in that such a pusher 8 includes a surface treatment designed, on the one hand, to permit the electrical conduction and, on the other hand, to prevent the creation of a galvanic couple between such a pusher 8 and the structure S.

Such a surface treatment may be formed of a coating such a pusher 8 includes, and which is formed of an electrically conductive material, for example a conductive silicone.

Figure 2:
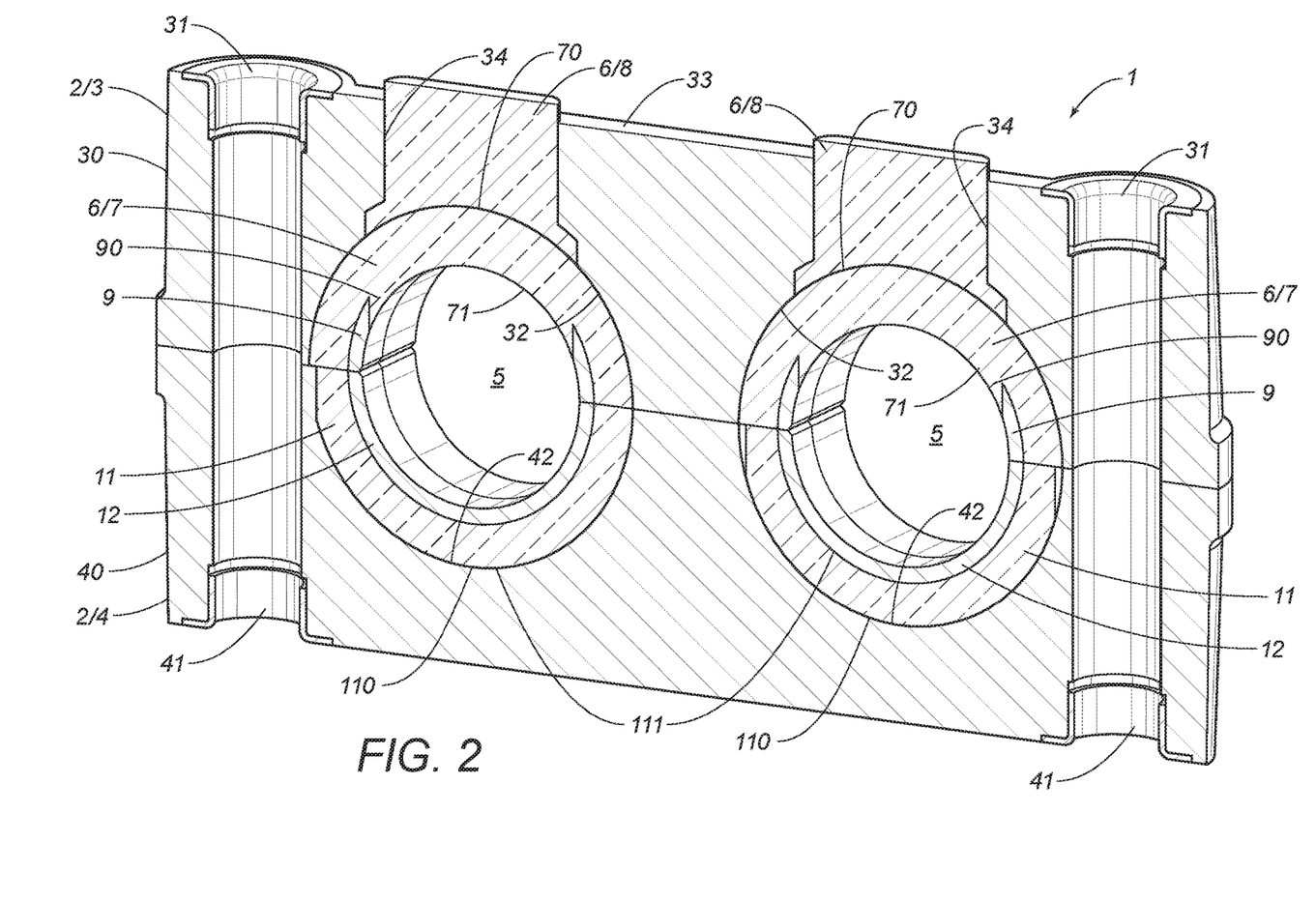
FIG. 2 is a schematic perspective and longitudinal cross-sectional view of the holding device shown in FIG. 1.
Figure 3:
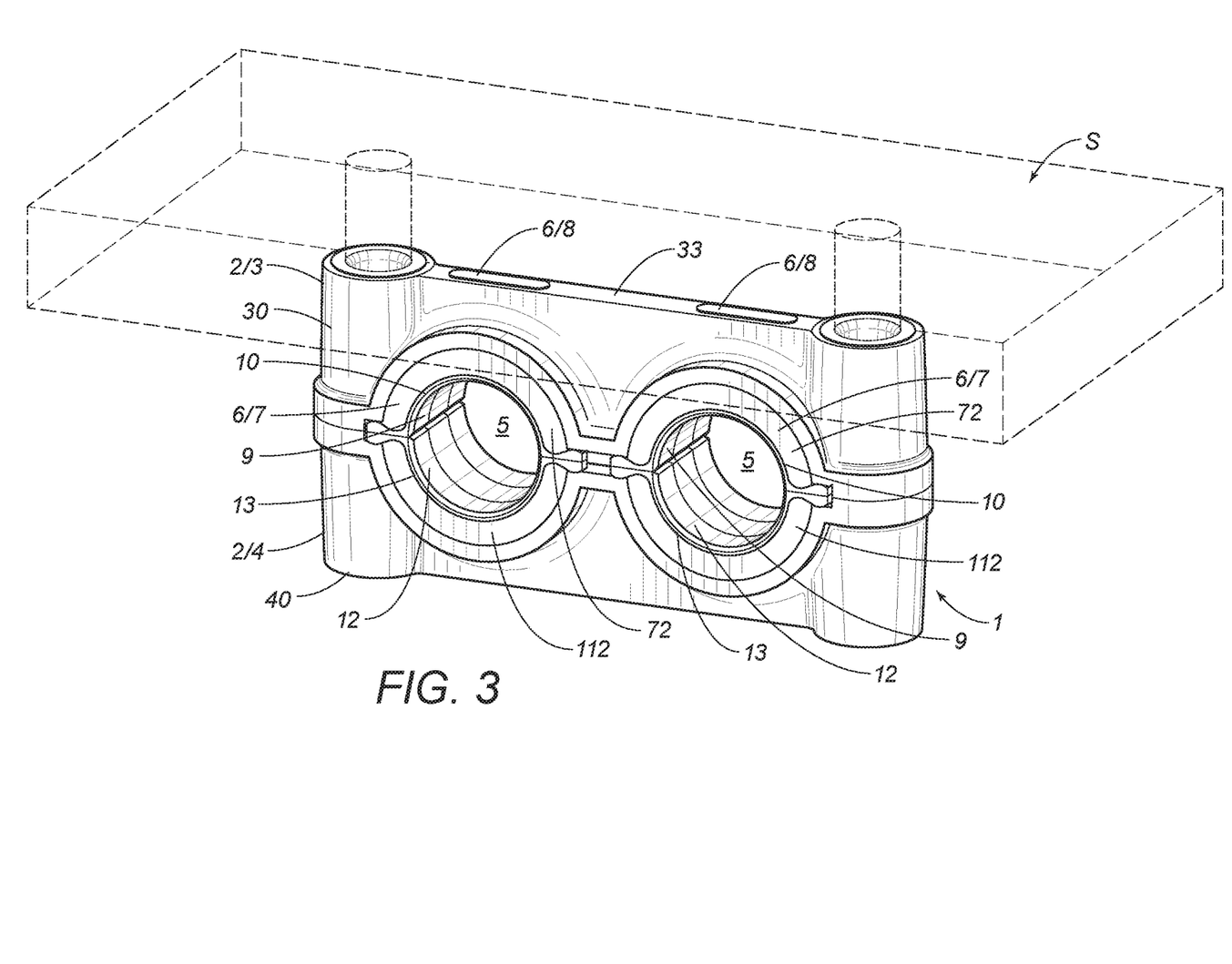
FIG. 3 is a schematic perspective and transparent view of a holding device according to the invention and fastened to a structure.
Figure 4:
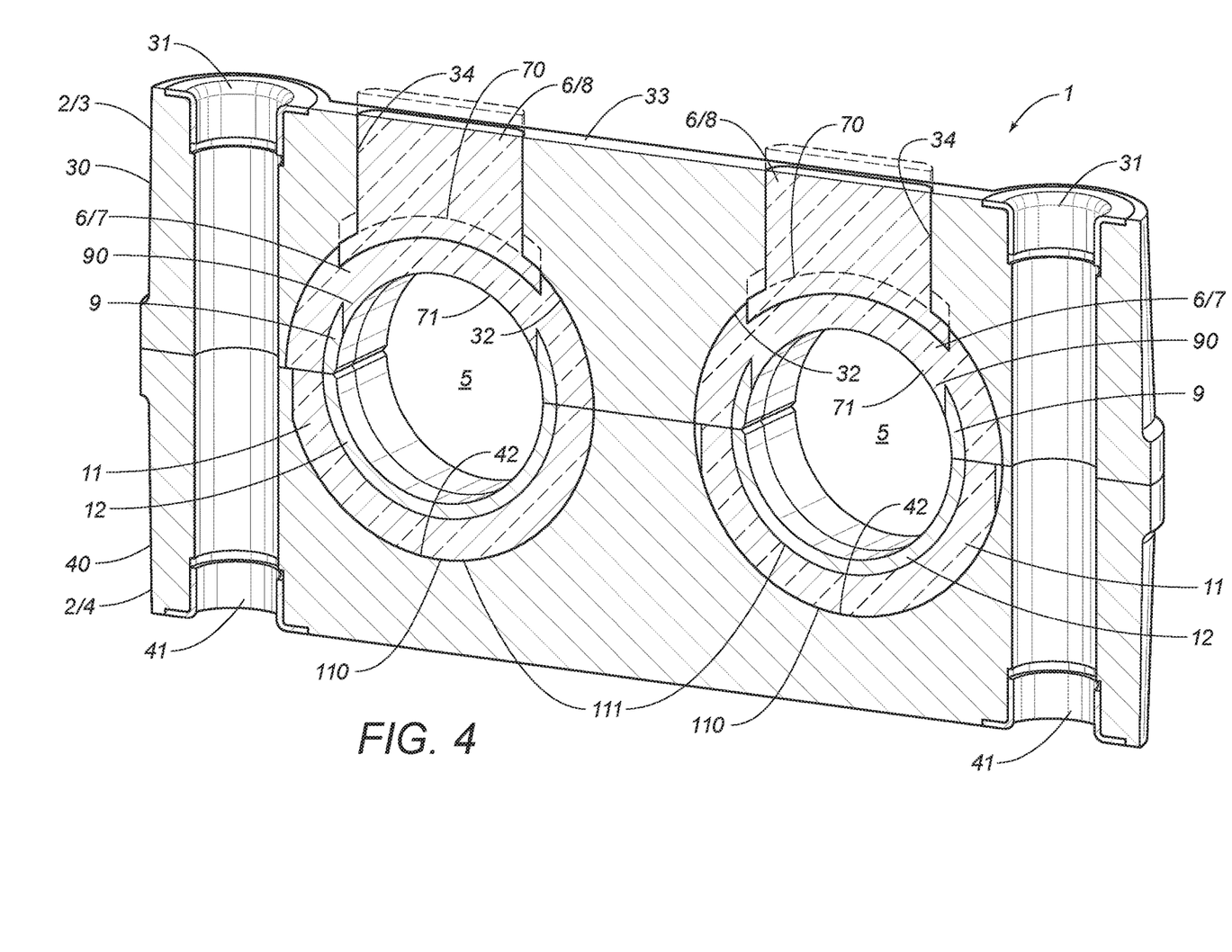
FIG. 4 is a schematic perspective and longitudinal cross-sectional view of the holding device according to the invention, in a configuration corresponding to that shown in FIG. 3 and wherein the holding device is fastened to the structure.

As mentioned above, such a pusher 8 is movable in displacement between an extended position outside the fastening half-flange 3 (FIGS. 1 and 2) and a retracted position inside this fastening half-flange 3 (FIGS. 3 and 4).

Figure 1:
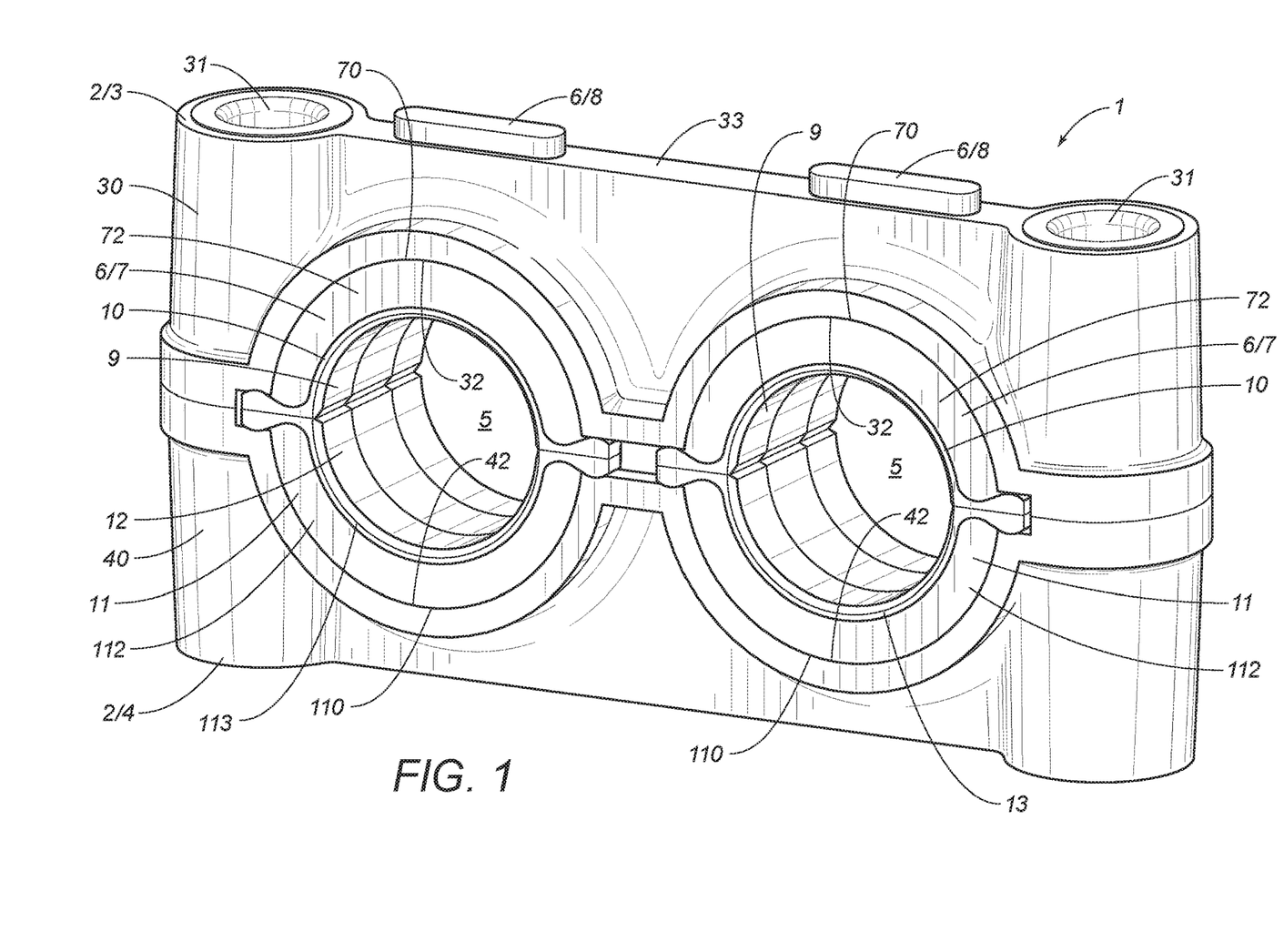
FIG. 1 is a schematic perspective view of a holding device according to the invention, in a configuration corresponding to that before the fastening of this device to a structure.

In this respect, it should be observed that this fastening half-flange 3 (more particularly the rigid body 30 of this fastening half-flange 3) includes a fastening face 33 intended to be oriented towards the structure S, even to cooperate with this structure S (more particularly in the position of fastening the holding device 1 to this structure S), and with respect to which the pusher or pushers 8 extend protruding, in the extended position (FIGS. 1 and 2).

Another feature of this fastening half-flange 3 resides in that it includes at least one through hole 34, each extending from this fastening surface 33 to the recess 32 or to one of the recesses 32 of this fastening half-flange 3, and each receiving the pusher 8 or one of the pushers 8 movable in translation inside such a through hole 34.

In this respect, it should be observed that such a through hole 34 passes more particularly through the rigid body 30 of the fastening half-flange 3, while such a pusher 8 is movable in translation within such a through hole 34, between said extended position (FIGS. 1 and 2) and the retracted position (FIGS. 3 and 4) of such a pusher 8.

Yet another feature of the fastening half-flange 3 relates to the fact that it includes at least one cradle 9, each made of a rigid material, each lining part of the inner face 71 of the pad 7 or of the pads 7 of this fastening half-flange 3, each configured to cooperate with the pipe or with one of the pipes as well as to be interposed between such a pad 7 and such a pipe.

Thus, such a cradle 9 lines only part of the inner face of the pad 7 or of one of the pads 7 of the fastening half-flange 3.

The fact that such a cradle 9 lines only part of the inner face 71 of such a pad 7 advantageously permits such a pad 7 to extend through such a cradle 9 and to be into direct contact with a pipe or with one of the pipes (this through its inner face 71).

In this respect, it should be observed that the cradle or cradles 9 each include a through opening 90 towards which the pusher 8 or one of the pushers 8 is oriented and is movable in displacement.

The presence of such a through opening 90 then advantageously permits the pad 7 to pass through the cradle 9 and to make a direct contact between this pad 7 and the pipe or one of the pipes, this under the action of the displacement of the pusher 8.

An additional feature resides in that such a through opening 90 is provided in a median portion of the cradle 9, more particularly in a median portion of the width of this cradle 9, in front of a median portion of the pad 7, more particularly in a median portion of the width of such a pad 7.

This feature advantageously permits, in order to create an electrical connection between such a pad 7 and a pipe, to remove the anticorrosion protective coating of such a pipe, in a particularly in a localized way and at a location located inside the fastening half-flange 3 and protected against the attacks from the external environment (humid and/or corrosive atmosphere) of the holding device 1.

As mentioned above, such a cradle 9 is configured to cooperate with the pipe or with one of the pipes.

In this respect, it should be observed that such a cradle 9 is configured to cooperate intimately and through most (or all) of the surface of the inner face of this cradle 9 oriented towards such a pipe. In fact and to this end, such a cradle 9 has a shape (more particularly the shape of a semicircle) and/or dimensions (more particularly an inner radius) adjusted to those of such a pipe.

According to a preferred embodiment, such a cradle 9 has then an inner radius corresponding to the outer radius of such a pipe.

An additional feature resides in that the cradle or cradles 9 of the fastening half-flange 3 each include, laterally and on both sides of the pad 7 or of one of the pads 7 of the fastening half-flange 3, a skirt 10 covering at least a portion of the flank 72 of this or these pads 7 of this fastening half-flange 3.

This feature advantageously permits to prevent the penetration of polluting substances between such a pad 7 and such a cradle 9, despite a movement of a pipe, which could tend to generate a gap between such a pad 7 and such a cradle 9.

Finally, such a cradle 9 the fastening half-flange 3 includes can be made of an electrically conductive material. However, and according to a preferred embodiment, such a cradle 9 is made of an electrically non-conductive material, more particularly an insulating material.

According to another feature of the holding device 1, the holding half-flange 4 includes at least one pad 11, each made of a flexible material, each lining the recess 42 or one of the recesses 42 of this holding half-flange 4, and each arranged in front of the pad 7 or of one of the pads 7 of the fastening half-flange 3.

This or these pads 11 of the holding half-flange 4 are preferably made of a compressible material. This feature permits, here too and advantageously, on the one hand, to guarantee an effective and durable holding of such a pipe within the holding device 1 and, on the other hand, a movement of such a pipe with respect to this holding device 1.

According to a preferred embodiment of the invention, this or these pads 11 of the holding half-flange 4 are, here too, made of silicone.

Another feature resides in that such a pad 11 has, on the one hand, an outer face 110 oriented towards a recess 42 of the rigid body 40 of the holding half-flange 4 and into contact with the surface of such a recess 42 (more particularly lining this surface) and, on the other hand, an inner face 111 opposite to the outer face 110 and intended to be oriented towards a pipe.

It should be observed that the pad 11 (or one of the pads 11) of the holding half-flange 4 and the pad 7 (or one of the pads 11) of the fastening half-flange 3 are arranged within the device 1, so as to substantially form a ring-shaped element.

Yet another feature of the holding half-flange 4 resides in that it includes at least one cradle 12, each made of a rigid material, each lining the inner face 111 of the pad 11 or of one of the pads 11 of this holding half-flange 4, and each configured to cooperate with the pipe or with one of the pipes as well as to be interposed between such a pad 11 and such a pipe.

Thus, such a cradle 12 lines the inner face of the pad 11 or of one of the pads 11 of the holding half-flange 4. According to a preferred embodiment, such a cradle 12 completely lines the inner face of such a pad 11.

As mentioned above, such a cradle 12 is configured to cooperate with the pipe or with one of the pipes.

In this respect, it should be observed that such a cradle 12 is, here too, configured to cooperate intimately and through most (or all) of the surface of the inner face of this cradle 12 oriented towards such a pipe. Here too and to this end, such a cradle 12 has a shape (more particularly the shape of a semicircle) and/or dimensions (more particularly an inner radius) adjusted to those of such a pipe.

According to a preferred embodiment, such a cradle 12 has then an inner radius corresponding to the outer radius of such a pipe.

An additional feature resides in that the cradle or cradles 12 of the holding half-flange 4 each include, laterally and on both sides of the pad 11 or of one of the pads 11 of the holding half-flange 4, a skirt 13 lining at least part of the sidewall 112 of this or these pads 11 of this half-holding flange 4.

This feature permits, here too and advantageously, to prevent a penetration of polluting substances between such a pad 11 and such a cradle 12, in spite of a movement of a pipe, which could tend to generate a gap between such a pad 11 and such a cradle 12.

Such a cradle 12 the holding half-flange 4 includes can be made of an electrically conductive material or (and preferably) of an electrically non-conductive material (more particularly an insulating material).

Finally, it should be observed that the cradle 12 (or one of the cradles 12) of the holding half-flange 4 and the cradle 9 (or one of the cradles 9) of the fastening half-flange 3 are arranged within of the holding device 1, so as to substantially form a ring-shaped element.

Such an element is surrounded by the annular element formed by the pad 7 (or one of the pads 7) of the fastening half-flange 3 and the pad 11 (or one of the pads 11) of the holding half-flange 4.

In addition, such an element surrounds the pipe or one of the pipes of the pipework.

I claim:

1. A device for holding at least one electrically conductive pipe on an electrical conductive structure with an electrical connection between the structure and the at least one pipe, said device comprising:
    a flange being comprised of:
        a fastening half-flange fastened to the structure;
        a holding half-flange assembled with the fastening half-flange and complementary to the fastening half-flange,
    wherein each of the fastening half-flange and the holding half-flange is comprised of a rigid body having at least one recess opposite a complementary half-flange, each of the at least one recess configured to receive a pipe, each rigid body arranged in front of a complementary rigid body so as to align a respective at least one recess with a complementary at least one recess of the other half-flange, each at least one recess and each complementary at least one recess are positioned so as to form an accommodation for receiving the at least one pipe; and
    an electrical connector for the structure and the at least one pipe being positioned on the fastening half-flange, wherein the electrical connector comprises:
    at least one pad, each of the at least one pad being comprised of an electrically conductive flexible material so as to be electrically cooperative with the at least one pipe, and each of the at least one pad lining the at least one recess of the fastening half-flange, and
    at least one pusher, each of the at least one pusher being comprised of an electrically conductive material, so as to be electrically cooperative with the structure and a corresponding pad, each of the at least one pusher being movable in displacement between an extended position outside the fastening half-flange and a retracted position inside the fastening half-flange.

2. The device according to claim 1, wherein the holding half-flange comprises at least one pad, each of the at least one pad being comprised of a flexible material, each of the at least one pad lining the recess of the holding half-flange and each of the at least one pad being arranged in front the pad of the fastening half-flange.

3. The device according to claim 2, wherein the holding half-flange comprises at least one cradle, each of the at least one cradle being comprised of a rigid material, each of the at least one cradle lining the inner surface of the pad of the holding half-flange, and each of the at least one cradle being cooperative with the pipe and interposed between the pad and a pipe.

4. The device according to claim 1, wherein the pad is comprised of a compressible material.

5. The device according to claim 1, wherein the pad is comprised of silicone.

6. The device according to claim 1, wherein the pusher is comprised of a rigid and/or metallic material.

7. The device according to claim 1, wherein the fastening half-flange comprises a fastening face oriented towards the structure, even to cooperate with the structure, and at least one through hole, each through hole extending from the fastening surface to the recess of the fastening half-flange and each through hole receiving the pusher movable in translation inside such a through hole.

8. The device according to claim 1, wherein the fastening half-flange comprises at least one cradle, each of the at least one cradle being comprised of a rigid material, each of the at least one cradle lining part of the inner face of the pad of this fastening half-flange, each of the at least one cradle being cooperative with the pipe and interposed between the pad and a pipe.

9. The device according to claim 8, wherein each of the at least one cradle is comprised of a through opening towards which the pusher is oriented and is movable in displacement.

10. The device according to claim 8, wherein the cradle has an inner radius corresponding to the outer radius of the pipe.

11. The device according to claim 8, wherein the cradle comprises, laterally and on both sides of the pad, a skirt covering at least a portion of the flank pads.

12. A device for holding at least one electrically conductive pipe on an electrical conductive structure with an electrical connection between the structure and the at least one pipe, said device comprising:
    a flange being comprised of:
        a fastening half-flange fastened to the structure;
        a holding half-flange assembled with the fastening half-flange and complementary to the fastening half-flange,
    wherein each of the fastening half-flange and the holding half-flange is comprised of a rigid body having at least one recess opposite a complementary half-flange, each of the at least one recess configured to receive a pipe, each rigid body arranged in front of a complementary rigid body so as to align a respective at least one recess with a complementary at least one recess of the other half-flange, each at least one recess and each complementary at least one recess are positioned so as to form an accommodation for receiving the at least one pipe; and
    an electrical connector for the structure and the at least one pipe being positioned on the fastening half-flange, wherein the electrical connector comprises:
    at least one pad, each of the at least one pad being comprised of an electrically conductive flexible material so as to be electrically cooperative with the at least one pipe, and each of the at least one pad lining the at least one recess of the fastening half-flange, and
    at least one pusher, each of the at least one pusher being comprised of an electrically conductive material so as to be electrically cooperative with the structure and a corresponding pad, each of the at least one pusher being movable in displacement between an extended position outside the fastening half-flange and a retracted position inside the fastening half-flange,
    wherein the fastening half-flange comprises a fastening face oriented towards the structure, even to cooperate with the structure, and with respect to which the pusher extends protruding, in the extended position.

13. A device for holding an electrically conductive pipe on an electrical conductive structure with an electrical connection between the structure and the pipe, said device comprising:
    a flange comprising:
        a first half-flange so as to fasten to the structure; and a second half-flange removably assembled to said first half flange, said first half-flange being complementary to said second half-flange;

wherein said first half-flange is comprised of a first rigid body with a first recess, wherein said second half-flange is comprised of a second rigid body with a second recess, wherein said first rigid body is aligned with said second rigid body so as to form an accommodation with said first recess and said second recess, said first recess facing opposite said second recess; and an electrical connector within said first half-flange, wherein said electrical connector comprises:
- a pad being comprised of a first electrically conductive material and lining said first recess; and
- a pusher being comprised of a second electrically conductive material, said first electrically conductive material being more flexible than said second electrically conductive material, said pusher being extended outward from said first rigid body in an extended configuration, said pusher being retracted within said first rigid body in a retracted configuration, wherein said retracted configuration corresponds to said pusher and said pad in a first electrically conductive relationship so as to form an electrical connection between the structure and the pipe, and wherein said extended configuration corresponds to said pusher and said pad in a second electrically conductive relationship so as to form another electrical connection between the structure and the pipe.

\* \* \* \* \*